Patented Oct. 6, 1953

2,654,761

UNITED STATES PATENT OFFICE 2,654,761

IODINATED MERCAPTO-IMIDAZOLES

Charles F. Huebner, Morristown, and Caesar R. Scholz, Summit, N. J., assignors to Ciba Pharmaceutical Products, Incorporated, Summit, N. J., a corporation of New Jersey No Drawing. Application July 14, 1951,
Serial No. 236,861

15 Claims. (Cl. 260—309)

This invention relates to iodinated mercapto-imidazoles and to the preparation thereof.

A primary object of the invention is the embodiment of new potent antithyroid agents which possess advantages over those in present therapeutic use.

This object is realized, according to the present invention, by the iodinated mercapto-imidazoles which correspond to the formula

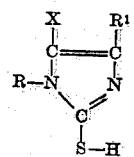

wherein $R^1$ stands for H, lower alkyl or I, X stands for H or I, at least one of $R^1$ and X being I, and R stands for H or lower alkyl.

A further object of the invention is the embodiment of methods for the preparation of the aforesaid iodinated mercapto-imidazoles.

This further object is realized, according to the invention, whereby the desired iodinated mercapto-imidazoles can be prepared by benzylating and then iodinating the corresponding mercapto-imidazole in the presence of alkali to form, for example, the 2-benzylmercapto-4,5-diiodo-imidazole. The latter compound is then debenzylated with the aid of aluminum bromide to form 4,5-diiodo-2-mercapto-imidazole.

To produce an N-alkylated-iodinated mercapto-imidazole, the 2-benzylmercapto-4,5-diiodo-imidazole, for example, may be treated with a lower diazo alkane and the resulting 1-lower alkyl - 2 - benzylmercapto - 4,5 - diiodoimidazole debenzylated.

To produce a monoiodo derivative, the 4,5-diiodo-2-mercapto-imidazole, for example, may be treated with a molar equivalent of a metal sulfite in aqueous alkaline solution. Alternatively, 4(5)-iodo-2-mercapto-imidazole can be prepared from 2-benzylmercapto-4,5-diiodo-imidazole by treating the latter with the metal sulfite followed by debenzylation.

Another type of mono-iodinated-imidazole derivative may be prepared by the iodination of 4(5)-alkyl-2-benzylmercapto-imidazoles, only one iodine being introduced into the molecule. Debenzylation yields the 4(5)-alkyl-5(4)-iodo-2-mercapto-imidazole.

The convention 4(5)- or 5(4)- is used to indicate that the designated substituent may be in either the 4- or the 5-position. It will be noted, in this regard, that in the 2-mercapto-imidazoles which are unsubstituted in the 1- or 3-positions, the 4- and 5-positions are interchangeable. Thus, 5-iodo-2-mercapto-4-iodo-2-mercapto-5-methyl-imidazole.

The various transformations according to the invention are carried out according to the following reaction scheme:

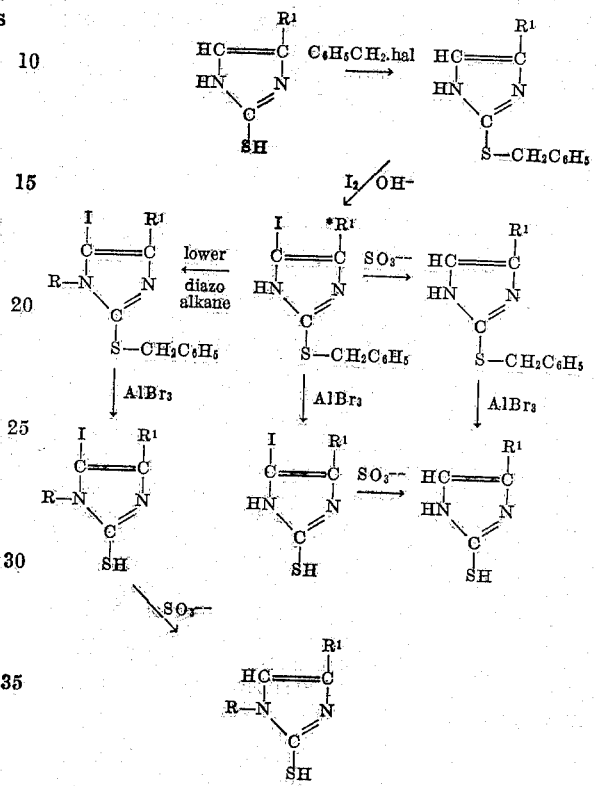

(* If $R^1=H$, it will change to I in the iodination step.)

In the foregoing scheme, R and $R^1$ have the previously-indicated significances.

In the above processes the reaction with benzyl halide is carried out in a solvent such as methanol, ethanol, dioxane and the like, and proceeds rapidly at moderate temperatures.

Iodination proceeds rapidly at room temperature (20 to 30° C.) in a solvent mixture such as aqueous dioxane, aqueous methanol and the like.

Alkylation of the 2-benzylmercapto-4,5-diiodoimidazole is advantageously carried out in a lower aliphatic alcohol (ethanol, methanol) or ketone (acetone) using a lower diazo alkane at room temperature.

Debenzylation is accomplished by treating the 2-benzylmercapto derivative with anhydrous aluminum bromide at room temperature in a solvent such as benzene, carbon disulfide, carbon tetrachloride and the like.

The new compounds of the present invention are useful as therapeutica, as anti-thyroid agents and as X-ray contrast agents, which may be administered orally or in other suitable manner, e. g. by intravenous injection, or as intermediates for the preparation of such therapeutica.

The following examples set forth representative exemplary embodiments of the invention, and these examples are intended to be solely illustrative and not at all limitative. In these examples, the temperatures are given in degrees centigrade. Parts by weight bear the same relation to parts by volume as do grams to milliliters. Percentages are by weight. All melting points are uncorrected.

*Example 1*

58 parts by volume of benzyl bromide are added to a suspension of 49 parts by weight of 2-mercapto-imidazole in 300 parts by volume of ethanol. Immediate reaction is evident by a rapid rise in temperature of the mixture. After two hours, by which time the reaction mixture has cooled, an equal volume of ether is added to bring about complete precipitation of 2-benzylmercapto-imidazole hydrobromide which is filtered off. The latter is converted to the free base by dissolving in water and making the solution alkaline with an excess of ammonia. The free base is recrystallized from methanol; it melts at 145–146°.

15 parts by weight of the thus-prepared 2-benzylmercapto-imidazole are suspended in a mixture of 200 parts by volume of dioxane and a solution of 19 parts by weight of sodium hydroxide in 80 parts by volume of water. To the suspension, while stirring, is added a solution of 40 parts by weight of iodine and 40 parts by weight of potassium iodide in 100 parts by volume of water. The addition takes about ½ hour, and is carried out with external cooling in order to maintain a temperature of about 20–30°. After another half hour, most of the dioxane is removed by distillation in vacuo. The resulting reaction mixture is acidified with hydrochloric acid and the solid thoroughly triturated to insure complete decomposition of the sodium salt of the imidazole. The slight excess of iodine remaining is decolorized by the cautious addition of sodium bisulfite. The crystalline 2 - benzylmercapto - 4,5 - diiodo-imidazole thus obtained is filtered and recrystallized from ethanol; it melts at 144–145°.

2 parts by weight of the said 2-benzylmercapto-4,5-diiodo-imidazole are stirred under anhydrous conditions with 2.4 parts by weight of anhydrous aluminum bromide in 20 parts by volume of benzene or toluene for six hours. Ice is added slowly with stirring to destroy the aluminum complex. The crude 4,5-diiodo-2-mercapto-imidazole is collected by filtration and is dissolved in 20 parts by volume of water containing 0.3 part by weight of potassium hydroxide. Activated carbon is added and mixture filtered. The addition of acetic acid to the filtrate causes the precipitation of pure 4,5-diiodo-2-mercapto-imidazole.

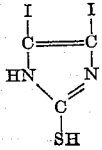

which melts at 170° (darkening and decomposition).

*Example 2*

2 parts by weight of 2-benzylmercapto-4,5-diiodo-imidazole are dissolved in 50 parts by volume of warm ethanol, quickly cooled and treated with an excess of ethereal diazomethane. After 2 hours, the solvent is removed by distillation and the residue recrystallized from ethanol; it melts at 73–74°.

8.5 parts by weight of the thus-obtained 2-benzylmercapo - 4,5 - diiodo - 1 - methyl - imidazole are debenzylated by stirring with 10 parts by weight of anhydrous aluminum bromide in 90 parts by volume of benzene. The reaction mixture is worked up and the crude product purified as described in Example 1. The obtained 4,5-diiodo-2-mercapto-1-methyl-imidazole is recrystallized from ethanol; it melts at 170° with decomposition and darkening, preliminary softening starting at 160°.

The product corresponds to the formula

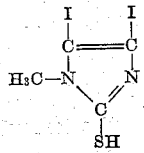

*Example 3*

5 parts by weight of 2-benzylmercapto-4,5-diiodo-imidazole are refluxed with 5 parts by weight of sodium bisulfite in 50 parts by volume of ethanol-water (5:1) for 12 hours. The solvent is distilled off and the crystalline residue filtered, washed with water and recrystallized from benzene-petroleum ether to yield 2-benzylmercapto-4(5)-iodo-imidazole, which melts at 107–110°.

1 part by weight of the said 2-benzylmercapto-4(5) - iodo - imidazole dissolved in benzene is treated with 1.7 parts by weight of anhydrous aluminum bromide according to the prescriptions of Example 1 (last paragraph). The 4(5)-iodo-2-mercapto-imidazole thus obtained is recrystallized from ethanol-water; it melts at 175°, with darkening and decomposition after preliminary softening at 170°. The product corresponds to the formula

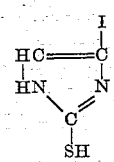

*Example 4*

10 parts by weight of 4,5-diiodo-2-mercapto-imidazole and 7.5 parts by weight of sodium sulfite heptahydrate are dissolved in 200 parts by volume of water containing 1.5 parts by weight of sodium hydroxide, and the solution heated to boiling under a reflux condenser. The refluxing is continued for 24 hours. After cooling and the addition of excess of acetic acid, 4(5)-iodo-2-mercapto-imidazole—identical with the product of Example 3—is obtained.

*Example 5*

10 parts by weight of 4,5-diiodo-2-mercapto-1-methyl-imidazole and 7 parts by weight of sodium sulfite heptahydrate in 200 parts by volume of water containing 1.5 parts by weight of sodium hydroxide are refluxed for 12 hours.

Addition of acetic acid precipitates monoiodo-2-mercapto-1-methyl-imidazole which is recrystallized from ethanol; it melts at 164° (darkening at decomposition). The product corresponds to the formula

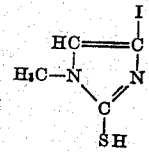

Example 6

10.5 parts by volume of benzyl bromide are added to a suspension of 10 parts by weight of 1-mercapto-4(5)-methyl-imidazole in 60 parts by volume of ethanol. After reaction as described in Example 1, the hydrobromide is obtained by precipitation with ether and the free base, 2-benzylmercapto-4(5)-methyl-imidazole is obtained after recrystallization from ethanol; melting point 105–106°.

15 parts by weight of the said 2-benzylmercapto-4(5)-methyl-imidazole are suspended in a mixture of 200 parts by volume of dioxane and a solution of 8.9 parts by weight of sodium hydroxide in 37 parts by volume of water. To the stirred suspension is added a solution of 18.6 parts by weight of iodine and 18.6 parts by weight of potassium iodide in 100 parts by volume of water. The addition is made gradually over a period of one-half hour while maintaining the temperature between 20° and 30°. After another half hour, the reaction mixture is worked up as described in Example 1. The formed crystalline 2 - benzylmercapto-5(4)-iodo-4(5)-methyl-imidazole, on recrystallization from ethanol, melts at 155–157°.

2 parts by weight of the benzylmercapto-5(4)-iodo-4(5)-methyl-imidazole are stirred in 20 parts by volume of benzene for six hours with 2.33 parts by weight of anhydrous aluminum bromide. The product is recovered and purified as described in Example 1. After recrystallization from ethanol, the obtained 5(4)-iodo-2-mercapto-4(5)-methyl-imidazole melts with decomposition at 175–180°. It corresponds to the formula

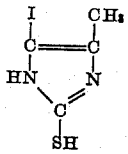

Example 7

8.4 parts by volume of benzyl bromide are added to a suspension of 10 parts by weight of 2-mercapto-4-propyl-imidazole in 60 parts by volume of ethanol. After reaction as described in Example 1, the hydrobromide is obtained by precipitation with ether. The non-crystalline free base is iodinated as described in Example 6, except that for 15 parts by weight of the formed 2-benzylmercapto - 4 - propyl - imidazole there are used 7.8 parts by weight of sodium hydroxide in 35 parts by volume of water and 16.4 parts by weight of iodine and 16.4 parts by weight of potassium iodide in 100 parts by volume of water. The iodinated product, 2-benzylmercapto-5-iodo-4-propyl-imidazole is isolated as described in Example 1; melting point 150–152°.

2 parts by weight of the 2-benzylmercapto-5-iodo-4-propyl imidazole are debenzylated with 2.2 parts by weight of anhydrous aluminum bromide and the product isolated as described in Example 1. After recrystallization from ethanol, 5-iodo-2-mercapto-4-propyl-imidazole is obtained; melting point 170° (with decomposition). It corresponds to the formula

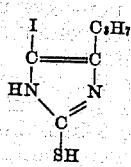

Having thus disclosed the invention, what is claimed is:

1. An iodinated mercapto-imidazole of the formula

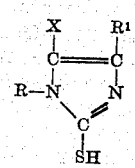

where R stands for a member selected from the group consisting of hydrogen and lower alkyl, $R^1$ stands for a member selected from the group consisting of hydrogen, lower alkyl and iodine, X stands for a member selected from the group consisting of hydrogen and iodine, at least one of $R^1$ and X being iodine.

2. 2-mercapto-4-iodo-1-lower alkyl-imidazole.
3. 2-mercapto-4,5-diiodo-1-lower alkyl-imidazole.
4. 5-iodo-2-mercapto-4-lower alkyl-imidazole.
5. 2-mercapto-4,5-diiodo-imidazole.
6. 2-mercapto-4-iodo-imidazole.
7. 2-mercapto-4,5-diiodo-1-methyl-imidazole.
8. 4(5)-monoiodo-2-mercapto-1-methyl-imidazole.
9. 5-iodo-2-mercapto-4-methyl imidazole.
10. In a process for the production of an iodinated mercapto-imidazole, the step of subjecting a 2-benzylmercapto-4-$R^1$-imidazole, wherein $R^1$ stands for a member selected from the group consisting of hydrogen, lower alkyl and iodine, to debenzylation with aluminum bromide in a non-polar non-oxygenated inert solvent to produce the corresponding 2-mercapto-4-$R^1$-imidazole.
11. A process for the production of an iodinated mercapto-imidazole which includes the steps of reacting a 2-mercapto-4-$R^1$-imidazole, wherein $R^1$ stands for a member selected from the group consisting of hydrogen, lower alkyl and iodine, with benzyl bromide in an oxygenated polar solvent, wherein the corresponding 2-benzylmercapto compound is formed, reacting the latter with iodine in an aqueous neutral water-miscible inert solvent containing alkali, whereby a 5-iodo-2-benzylmercapto compound results, and subjecting the said 5-iodo compound to debenzylation with aluminum bromide in a non-polar non-oxygenated inert solvent to produce the corresponding 5-iodo-2-mercapto-imidazole.
12. A process for the production of an iodinated mercapto-imidazole which includes the steps of reacting a 2-mercapto-4-$R^1$-imidazole, wherein $R^1$ stands for a member selected from the group consisting of hydrogen, lower alkyl and iodine, with benzyl bromide in an oxygenated polar solvent, whereby the corresponding 2-benzylmercapto compound is formed, reacting the latter with iodine in an aqueous neutral water-miscible inert solvent containing alkali, whereby a 5-iodo-2-benzylmercapto compound results, treating the said 5-iodo compound with a lower diazo alkane in a solvent selected from the group consisting of a lower aliphatic alcohol and ketone, and then subjecting the obtained 1-lower alkyl-5-iodo compound to debenzylation with aluminum bromide in a non-polar non-oxygenated inert solvent to produce the corresponding 1-lower alkyl-5-iodo-2-mercapto-imidazole.

13. A process for the production of an iodinated mercapto-imidazole which comprises subjecting a 4,5-diiodo-2-benzylmercapto-imidazole to debenzylation with aluminum bromide in a non-polar non-oxygenated inert solvent to produce the corresponding 4-5-diiodo-2-mercapto-imidazole, and then reacting the latter with a molar equivalent of a metal sulfite to produce the 4(5) monoiodo-2-mercapto-imidazole.

14. A process for the production of an iodinated mercapto-imidazole which comprises reacting a 4,5-diiodo-2-benzylmercapto-imidazole with a molar equivalent of a metal sulfite to produce the 4(5)-monoiodo-2-benzylmercapto-imidazole, and then subjecting the latter to debenzylation with aluminum bromide in a non-polar non-oxygenated inert solvent to produce the 4(5)-monoiodo-2-mercapto-imidazole.

15. A process for the production of an iodinated mercapto-imidazole which comprises treating a 4,5-diiodo-2-benzylmercapto-imidazole with a lower diazo alkane in a solvent selected from the group consisting of a lower aliphatic alcohol and ketone, subjecting the obtained 1-lower alkyl-4,5-diiodo-2-benzylmercapto-imidazole to debenzylation with aluminum bromide in a non-polar non-oxygenated inert solvent to produce the 1-lower alkyl-4,5-diiodo-2-mercapto-imidazole, and then reacting the latter with a molar equivalent of a metal sulfite to produce the 4(5)-monoiodo-2-mercapto-imidazole.

CHARLES F. HUEBNER.
CAESAR R. SCHOLZ.

References Cited in the file of this patent

Pauley: Ber. Deut. Chem. 43, pp. 2243–2261 (1910).

Pauley et al.: J. Prokt. Chem., vol. 118, pp. 33–47 (1928).

Astwood et al.: "Endocrinology," vol. 37 (1945), pp. 456–481.

Stanley et al.: "Endocrinology," vol. 44 (1949), page 588.

Stanley et al.: "Endocrinology," vol. 41 (1947), pp. 66–84.